United States Patent [19]

Schultz

[11] Patent Number: 5,530,916
[45] Date of Patent: Jun. 25, 1996

[54] RADIO GROUP CALL INITIATOR IDENTIFICATION STORAGE AND RECALL

[75] Inventor: Charles P. Schultz, Hialeah, Fla.

[73] Assignee: Motorola, Inc., Schaumburg, Ill.

[21] Appl. No.: 320,728

[22] Filed: Oct. 11, 1994

[51] Int. Cl.$^6$ .............................. H04B 7/26; H04Q 7/28
[52] U.S. Cl. ........................ 455/54.1; 455/34.1
[58] Field of Search .................. 455/34.1, 34.2, 455/53.1, 54.1, 54.2, 56.1; 340/825.44

[56] References Cited

U.S. PATENT DOCUMENTS 5,146,538  9/1992  Sobti et al. ............... 455/54.1 X
5,251,250  10/1993  Obata et al. ............. 455/54.1 X

OTHER PUBLICATIONS

Motorola, "MTS 2000™ Models II and III Portable Radios" Operating Instructions Manual No. 68P81072C45-C, pp. 1-120, 1993.

Primary Examiner—Chi H. Pham
Attorney, Agent, or Firm—Barbara R. Doutre

[57] ABSTRACT

In a radio communication system (100), radios initiating calls have their radio IDs stored by other radios in the radio communication system. The radio initiating the call can then send a voice request to a select one of the other radios in the system to establish a private conversation or other type of radio call (e.g., call alert, etc.) requiring the ID of the initiator radio. Since the other radios in the system automatically stored the ID of the radio initiating the call, they can establish a call with the initiator radio without even knowing that radio's ID number.

10 Claims, 2 Drawing Sheets

RADIO GROUP CALL INITIATOR IDENTIFICATION STORAGE AND RECALL

TECHNICAL FIELD

This invention relates in general to communication systems, and more specifically to a method for storage and recall of radio identification numbers.

BACKGROUND

In order for a radio user operating in a communication system such as a trunked radio system to make an individual call such as a call alert (feature which pages another radio directly), private call (feature which establishes a private call between two radios such as the Private Conversation™ feature found in systems sold by Motorola, Inc.), or another type of individual call to another radio user, he must know the radio identification number (ID) of the radio to be contacted (target radio). In present radio systems, the target radio's ID can be selected from a pre-stored ID list located in the radio (source radio) trying to contact the target radio. It can also be retrieved as the "last received ID" if the target radio user had previously called the source radio, or it can be directly entered through the radio's keypad, if the source radio is so equipped and radio user knows the radio ID of the other radio, which can be a problem in bigger communication systems.

Numeric keypads and/or radio displays needed to make individual calls may not be practical for smaller or less expensive radio designs, making it difficult, if not impossible, to initiate individual calls using these types of radios. With existing radios, two radio users cannot engage in an individual call with each other unless one of the two knows the individual ID of the other radio, or has it stored in his call ID list as mentioned previously. This makes it difficult for new users or someone using a borrowed radio to initiate an individual call to another radio in the system.

A need thus exists in radio communication systems for a method of capturing and storing radio IDs in order to be able to make individual calls to other radio users in a radio communication system.

DETAILED DESCRIPTION OF THE PREFERRED EMBODIMENT

Figure 1:
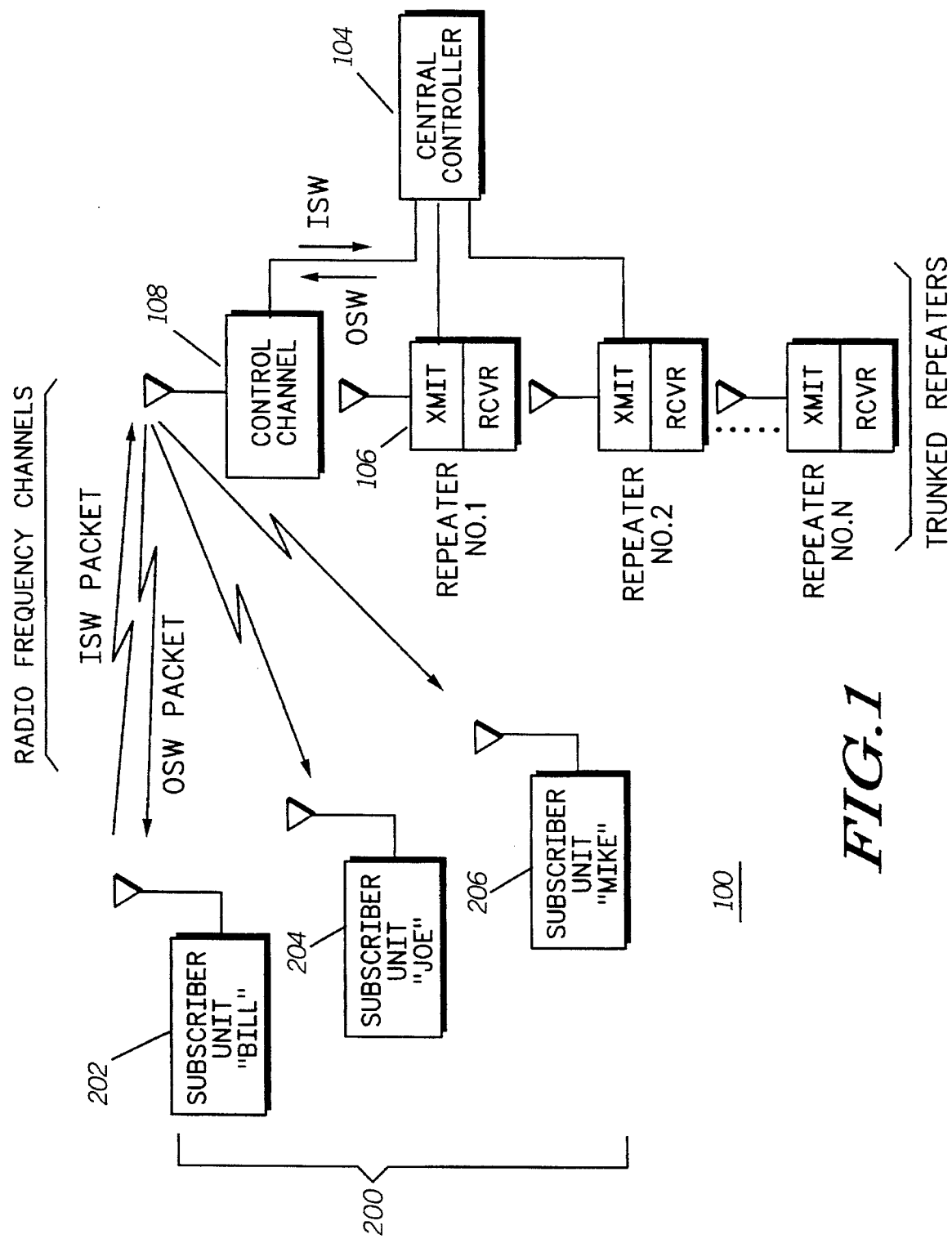
FIG. 1 shows a communication system in accordance with the present invention.

Referring now to the drawings and specifically to FIG. 1, there is shown a representation of a single site trunked communication (radio) system 100 in accordance with the present invention. The trunked radio system 100 consists of a control system which is commonly referred to as a central controller 104 which controls the assignment of repeaters 106 to different groups of subscriber units (radios) 200. Central controller 104 typically comprises a computer with database and appropriate control software.

To better understand the system 100, an example of the sequence of events for a standard radio group call will be described. When one of the radios 200 (i.e. in radio group A) that is in the system 100 presses his Push-to-talk button (PTT) a burst of data is transmitted to the central controller 104 via the system control channel 108. The data sent (Inbound signaling word or ISW) constitutes a request for a voice channel. Preferably, any of the repeaters 106 except the one acting as the control channel 108 can be a voice/data channel 106. The central controller 104 reviews the status of all the repeaters 106 and assigns an unused repeater 106 by sending an outbound signaling word (OSW) via the control channel 108 directing all radios 200 in group A to a frequency corresponding to one of the repeaters 106 (i.e. repeater No.1 or also known as channel No.1). The outbound signaling word is heard by all radios 200, but only the radios 200 in group A will be transferred to repeater No.1 (106). The other radios 200 in the system will continue to monitor the control channel 108. The individual radio which activated the PTT is now able to talk to any radio 200 in his group over repeater No.1 (106).

Other implementations of trunked radio systems for use with the current invention can include communication systems which do not have a dedicated control channel 108, but which use each of the channels 106 in the system to transmit the necessary system control information. Other systems which can utilize the present invention can include cellular telephone systems, and other related systems. The present invention can also be used in non-trunked radio systems, for use in making selective calls or call alerts to specific radios in the system.

In accordance with the present invention, when a radio user 202 (user "Bill") initiates a radio group call by pressing its push-to-talk (PTT) switch, it sends its radio ID and talk group ID as part of the group call request. In accordance with the present invention, the signaling word containing the radio's ID is transmitted by the system to other radios as part of the channel grant OSW sent by central controller 104. The other radios 204, 206 operating on the same trunked radio system (and typically just those in the same radio talk group as radio 202) can decode this transmission and store the initiator's ID (the ID of radio 202)in volatile and/or non-volatile memory. Storage in non-volatile memory can be automatic or selectable by the radio user through a button press and/or menu selection done at each individual radio. Each new ID decoded could write over the previous ID stored in volatile memory, but the IDs stored in non-volatile memory would be updated based on the automatic or selectable operation chosen by the radio user.

Once the radio's ID is placed into non-volatile memory, it becomes a member of the call ID list normally stored in the radio if the ratio is capable of supporting call ID lists. Typically, such radios have at least a display and also usually include a radio keypad. In non-display and/or keypad radios, every time a new radio talk group call is received, the ID of the initiator radio is automatically stored and the previous ID is overwritten. Preferably, the call ID list would have separate dedicated spaces for storing the last lid received via an individual call (e.g., a call alert from another user, etc.) and the ID stored from a regular radio group call. This makes the ID available to users of radios without keypads or those limited to list only calling via the radio's memory storage.

Illustrative Example

Figure 2:
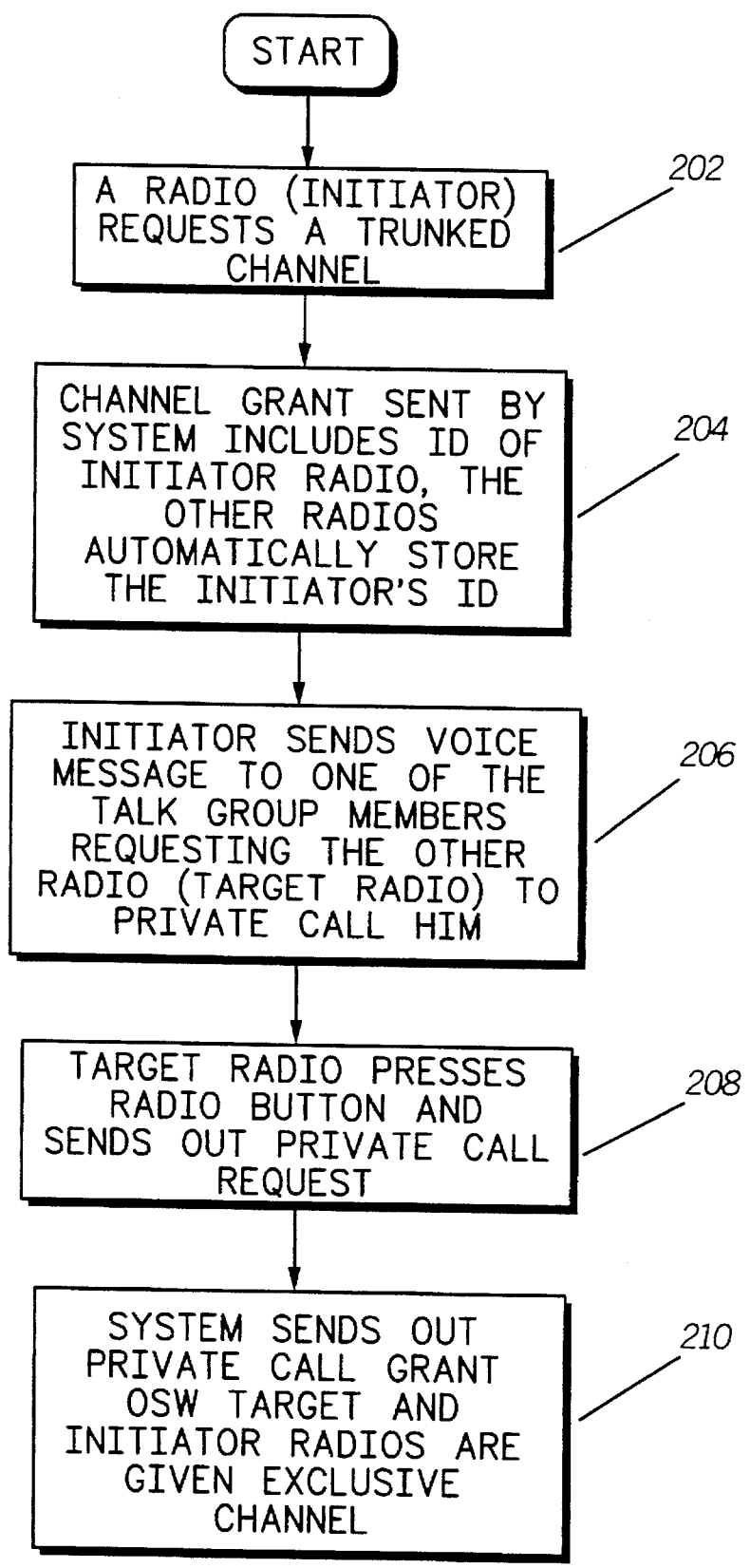
FIG. 2 shows the typical steps taken in order to establish an individual call such as a private conversation in accordance with the present invention.

In order to better understand the invention, a typical scenario using the present invention will be explained with reference to the flowchart shown in FIG. 2. The sequence begins by a radio 202 (radio user "Bill" transmitting a normal talk group channel request ISW. This ISW includes the ID of radio 202 (initiator) and the radio talk group ID. The system responds in step 204, with the typical channel grant OSW, but in accordance with the invention the initiator's ID which is sent along with the grant OSW is automatically stored by all of the radios in the talk group.

The initiator radio, radio 202, can at this point send a standard talk group voice message to all the members of the radio talk group. For example, the user of radio 202 can say, "Joe, can you private call me?", in step 206. Joe (the user of radio 204 and the target radio) by simply pressing a button on his radio in step 208, can send out a private call request or other type of individual call. This private call request will automatically include the radio ID of radio 102 ("Bill" radio given that he was the last radio receiving a channel grant). The system in step 210 assigns an exclusive communication channel 106 to the two radios so that other radios in the system can't listen in on their conversation and both radios can then commence their private call. Once they are finished, they can terminate the call and return to their standard talk group configuration.

As can be seen by the above example, by continuously saving the ID of the initiator of a standard radio talk group call, a radio user who may not even know his own radio ID (i.e., maybe he borrowed the radio) can enter into an individual call such as a private call with another radio. This is done by simply generating a talk group call (in a trunked radio system scenario) and asking the radio user he wants to have a private talk with (the target radio) to request a private call mode. Since all the radios in the initiators talk group in accordance with the invention had automatically stored his ID, anyone of them could have commenced the private conversation without even knowing his radio ID.

For radios which have displays and/or keypads, more than one radio ID can be stored and the multiple IDs can be placed in a circular ID list (e.g., 5 ID list, if more than 5 ID's are received, the oldest ID is deleted) which can be accessed via the radio's keypad. For example, if two channel requests occur, the radio will have stored in its radio list the ID of the initiator's of the two channel requests.

In summary, the present invention provides for an efficient method of storing radio IDs for later use in the establishment of individual calls such as private calls, call alert pages, etc. By automatically storing the ID of radios initiating standard radio talk group calls, a radio user does not even have to know its own radio ID number in order to establish an individual call with another radio. This is very helpful in systems in which radio users borrow radios or just receive radios from a "radio pool".

What is claimed is:

1. A method for establishing an individual call between first and second radios which are among a plurality of radios in a communication system, comprising the steps of:

(a) transmitting a group message by the first radio which includes its radio ID number;

(b) automatically storing the radio ID number of the first radio by each of the other radios from among the plurality of radios;

(c) sending a voice message by the first radio to the second radio requesting that the second radio establish an individual call with the first radio; and (d) transmitting a request by the second radio for establishing an individual call with the first radio which includes the radio ID number of the first radio.

2. A method as defined in claim 1, wherein the communication system is a trunked radio communication system.

3. A method as defined in claim 1, wherein the individual call request in step (d) is sent to a communication system controller which assigns a communication resource for use by the first and second radios.

4. A method as defined in claim 3, wherein the communication resource comprises a repeater.

5. A method as defined in claim 1, wherein the individual call request comprises a private call request between the first and second radios.

6. A method as defined in claim 1, wherein the individual call request comprises a call alert page from the second radio to the first radio and the further step is performed:

(e) receiving the request transmitted by the second radio at the first radio and generating an alert in response to the reception of the request.

7. A method for establishing an individual call between first and second radios which are among a plurality of radios in a trunked radio communication system, the plurality of radios being assigned to a plurality of radio talk groups and the first and second radios are assigned to the same radio talk group, the trunked radio communication system having a plurality of repeaters and a system controller for assigning the use of the repeaters, the method comprising the steps of:

(a) transmitting by the first radio a talk group call request which includes the radio ID number of the first radio;

(b) storing the radio ID number of the first radio by each of the plurality of radios which are assigned to the first radio's radio talk group which includes the second radio;

(c) sending a voice message by the first radio to the second radio requesting that the second radio establish an individual call with the first radio; and (d) transmitting a request by the second radio for establishing an individual call with the first radio which includes the radio ID number of the first radio.

8. A method as defined in claim 7, wherein step (b) is performed automatically.

9. A method as defined in claim 7, wherein the individual call comprises a private call and the following further steps are performed:

(e) receiving the individual call request at the central controller; and (f) assigning one from among the plurality of repeaters exclusively to the first and second radios so that they can carry out their private call.

10. A method as defined in claim 7, wherein the individual call comprises a call alert page and in step (d) the request sent by the second radio alerts (pages) the first radio.

* * * * *